United States Patent

Anderson et al.

[15] 3,690,088
[45] Sept. 12, 1972

[54] METHOD OF PACKAGING
[72] Inventors: Douglas W. Anderson, Palatine; Dave Chapman, Chicago, both of Ill.
[73] Assignees: Dave Chapman; Goldsmith & Yamasaki, Inc., Chicago, Ill.
[22] Filed: Sept. 8, 1970
[21] Appl. No.: 70,149

[52] U.S. Cl. .......................... 53/29, 53/39, 53/329, 156/73
[51] Int. Cl. .......................... B65b 7/28
[58] Field of Search ..... 53/29, 4 L, 39, 329; 156/582, 156/73; 220/67; 264/68

[56] References Cited

UNITED STATES PATENTS

| | | |
|---|---|---|
| 3,344,948 | 10/1967 | Edwards..................220/67 |
| 3,432,072 | 3/1969 | Quercia.....................220/67 |
| 3,338,775 | 8/1967 | Down et al. .............156/582 |
| 2,575,138 | 11/1951 | Slaughter..............53/29 UX |
| 2,853,118 | 9/1958 | Schnitzius..............264/68 X |

*Primary Examiner*—Theron E. Condon
*Assistant Examiner*—Eugene F. Desmond
*Attorney*—Fidler, Bradley, Patnaude & Lazo

[57] ABSTRACT

Method an apparatus for sealably securing a plastic closure to a thin-walled flexible tube by spin-welding wherein the tube is held against the closure by resilient clamping means during rotation of the closure. In one form of the invention the closure may be welded to a tubular container after the tube is filled.

12 Claims, 6 Drawing Figures

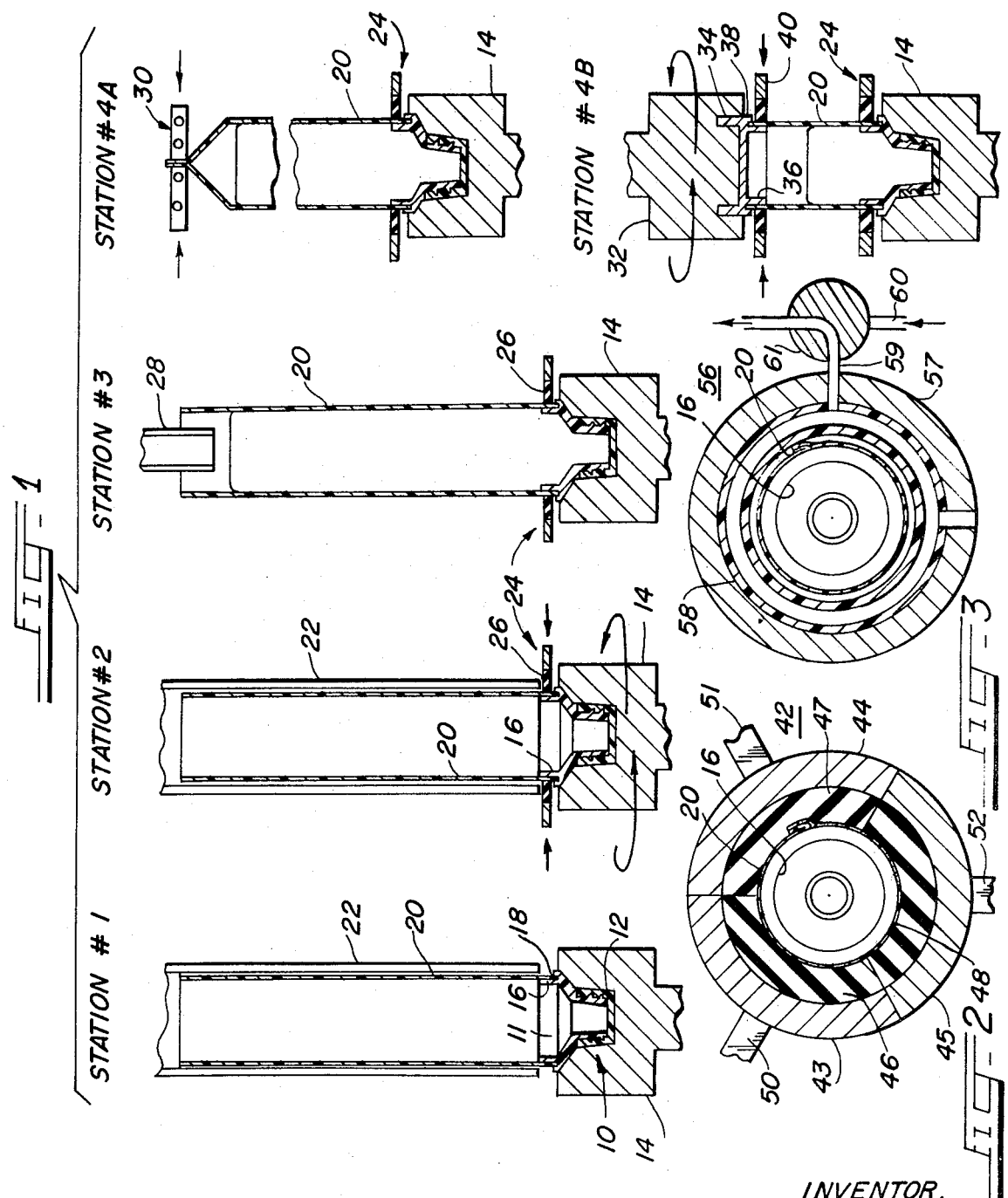

PATENTED SEP 12 1972 3,690,088
SHEET 2 OF 2
FIG-4
STATION #1
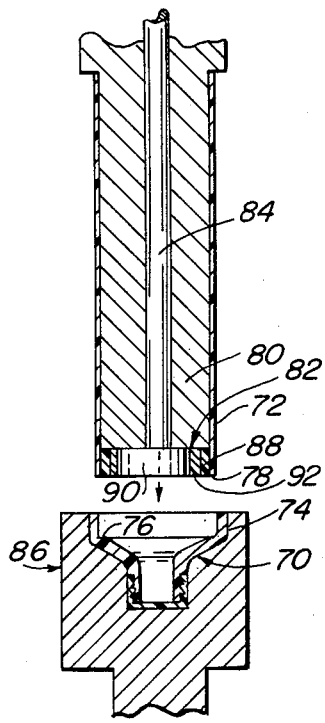
STATION #2
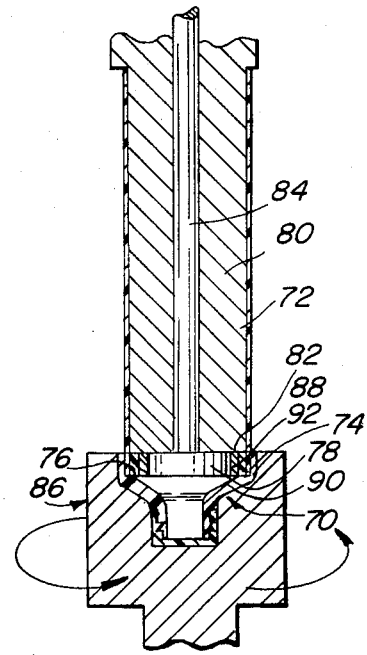
FIG-5
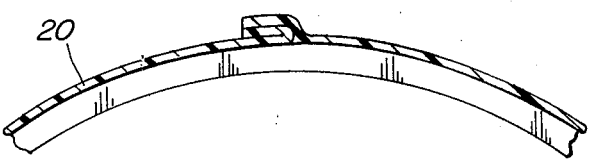
FIG-6
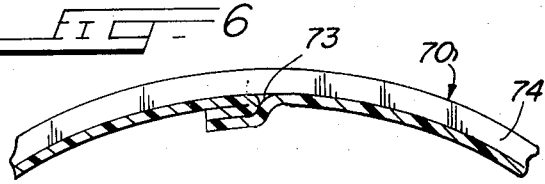
INVENTOR.
DOUGLAS W. ANDERSON
DAVE CHAPMAN
BY Fidler, Bradley, Patnaude & Legg
ATTY

METHOD OF PACKAGING

The present invention broadly relates to a new and improved method of sealing a closure to a flexible tube and it further relates to a method of packaging a fluid in a tubular, flexible container.

For various reasons including esthetics and cost reduction many fluid products are packaged in flexible plastic or plastic and metal laminated tubes. In many such packages as, for example, toothpaste tubes, it is desirable if not altogether necessary to secure a separate closure element to at least one end of the tube. However, sealably securing plastic closures to flexible tubes has proven to be both difficult and expensive and has interfered with the adaption of such containers to automated package forming and fill lines. Additionally, the joint between the tube and the closure element has frequently been unsightly, thus necessitating the use of other means for covering or at least camouflaging such joints.

Unsuccessful attempts at sealing flexible plastic or plastic surfaced tubes to plastic closures have included ultrasonic welding, cementing and localized heating. Although the technique of spin-welding two plastic parts together has been known and successfully used to secure two relatively rigid plastic parts together, it has not been applied to the welding of flexible parts. Because of its relatively simplicity, however, it would be desirable to use this technique for sealably securing plastic closures to thin-walled flexible tubes.

Therefore, an object of this invention is to provide a new and improved method for sealably securing a closure element to a flexible tube.

Another object of this invention is to provide a new and improved method for spin-welding a plastic closure to a flexible plastic tube.

A further object of this invention is to provide a new and improved method of forming a tubular container, filling it and then sealing it by means of a plastic closure.

A still further object of this invention is to provide new and improved apparatus for spin-welding a relatively rigid plastic element to a plastic surface of a flexible tube.

A yet further object of this invention is to provide a new and improved clamping and compression device which may be used in spin-welding a closure to a flexible tube.

Briefly, the above and further objects may be realized by mounting a rigid plastic part on a rotatable chuck, positioning a portion of a plastic tube over a cylindrical peripheral portion of said plastic part, compressing said tube against said part, and then momentarily rotating said chuck while holding said tube stationary, thereby to melt the interface between the plastic part and the tube so that when the chuck is stopped the melted interface sets to sealably join the plastic part and the tube together. Where the first part is a closure element, the tube may thereafter be filled with a product and the method repeated to secure another plastic closure to the upper end of the tube.

In order to compress the tube against the plastic part and to prevent rotation of the tube during rotation of the chuck, a clamping means comprising a plurality of rubber-lined jaws, or a single fluid expandable annular tube may be employed. In both cases the clamping means is held stationary during rotation of the chuck.

Further objects and advantages and a better understanding of the present invention may be had by reference to the following detailed description taken in connection with the accompanying drawings wherein:

FIG. 1 is a schematic illustration of a four-station package forming and fill line embodying the present invention;

FIG. 2 is a sectional view of one type of compression and clamping means used for holding the flexible tube during the spin-welding operation in the system of FIG. 1;

FIG. 3 is a top plan view of another type of compression and clamping means embodying another aspect of the present invention and used for holding the flexible tube during the spin-welding operation in the system of FIG. 1;

FIG. 4 is a schematic illustration of the first two stations of a package forming and fill line embodying another aspect of the present invention;

FIG. 5 is an enlarged view of the end portion of a flexible tube usable with this invention in the embodiment of FIG. 1 and bonded to a closure; and FIG. 6 is an enlarged view of the end portion of a flexible tube usable with this invention in the embodiment of FIG. 4 and bonded to a closure.

In FIG. 1 thereof, there is shown a system for forming, filling and sealing a flexible tubular package. As there shown, this system may comprise four stations preferably arranged in a circle so that the package may be carried from station to station by a rotatable turret. At station No. 1 a previously formed plastic closure 10 including a nozzle element 11 and a removable cap 12 are placed in a rotatable chuck 14 which may be of any conventional type such as the mechanical or vacuum type for holding the closure assembly 10 in place therein during the package forming and filling steps. As shown, the nozzle element 11 includes a skirt 16 and a annular groove 18 lying coextensive with the outer surface of the skirt 16 to receive the lower end portion of a thin-walled flexible tube 20. The width of the groove 18 is greater than the thickness of the tube 20 to facilitate assembly of the tube 20 to the closure. The tube 20 which may be a preformed plastic laminate wherein the inner surface thereof is plastic or which may be an extruded plastic tube is fed downwardly through a guide tube 22 to position it over the skirt 16 and at least partly within the groove 18. It will be noted that the skirt 16 is slightly tapered to facilitate the assembly of the tube 20 onto the closure assembly 10. After the tube 20 has thus been assembled onto the closure 10, a compression means or a clamp device 24 having a resilient circular face portion 26 is contracted to compress an annular portion of the tube 20 against the adjacent face of the skirt 16. The chuck 14 is then rotated at a sufficient speed and for a time sufficient to melt the plastic at the interface between the tube 20 and the adjacent portion of the skirt 16. It has been found that there is sufficient friction between the abutting surfaces of the flexible tube 20 and the skirt 16 to generate sufficient heat to melt both of the adjoining surfaces in a few seconds when the chuck is rotated at 1,000 rpm while the clamping device is held stationary. The resilient face portion of the clamping means may be smooth surfaced rubber. Almost immediately after the chuck is stopped a good, air-tight seal is provided between the closure 10 and the tube 20.

The guide 22 is then removed and as shown in FIG. 3, a fill tube 28 is inserted into the tube 20 while the clamping device 24 is still in place to support the tube 20 in the upright position. The product which in this case may be a liquid, a pasty or granular material or the like is then fed into the tube 22 from the fill tube 28 until the desired amount of the product is within the tube. The fill tube 28 is then withdrawn and the filled tube is moved to the fourth station.

As shown at Station 4a, the fill tube 28 has been removed and a suitable heat sealing device 30 which may be of the ultrasonic or electrically heated type and includes a pair of reciprocal clamping and heating elements 31a and 31b is then operated to bring the elements into engagement with the tube 20 to seal the upper end thereof. Except for possible trimming of the portion of the tube 20 above the upper seal the package is completed. The clamping device 24 may then be released and the chuck 14 operated to release the closure 10 whereby the completely formed and filled package may be removed or ejected.

In some types of packages, particularly those of the self-standing type, it is desirable that the bottom (top as shown in FIG. 1) of the flexible tube be sealed by means of a separate closure element which may serve as a base. In such an application, after the tube 20 has been filled as illustrated at Station 3, the fill tube 28 is removed and the filled tube is moved to Station 4b where another chuck 32 in which a bottom plastic closure element 34 has been mounted is then moved downwardly so that a conical skirt portion 36 of the closure is inserted into the tube 20 and the upper distal end of the tube 20 is positioned in an annular groove 38 provided in the closure 34 in alignment with the outer surface of the skirt 36. It will be noted that a guide tube is unnecessary since the product causes the tube 20 to assume a cylindrical position during insertion of the skirt 36 therein. A compression means or clamping device 40 is then operated to compress an annular upper portion of the tube 20 against the skirt 36. While holding the clamp device 40 stationary, the chuck 32 is then rotated for a few seconds to melt the abutting surfaces of the tube 20 and the skirt 36. The chuck 32 is stopped and the melted portions of the tube 20 and the skirt 36 reset to seal the product within the package. The chuck 32 and the clamping device 40 are then operated to release the closure member 34 and the tube 20, the chuck and clamps are elevated, the lower clamp 24 is opened and upon release of the closure 10 from the lower chuck 14 the completely filled and sealed package may be removed or ejected.

Referring to FIG. 2, there is illustrated a particular clamp or compression device 42 of the type which may be used for either or both of the clamps 24 and 40. As there shown, three separate jaws 43, 44, and 45 are provided and each includes a rubber or other resilient liner 46, 47, and 48 for engagement with the tube 20. Each of the jaws 43, 44, and 45 has an angular extent of 120° and is mounted on a respective one of a plurality of rods 50, 51, and 52 which may be solenoid operated to reciprocate the jaws between the closed, tube engaging position as illustrated and a retracted open position out of engagement with the tube 20. Because of the flexible nature of the tube 22 and the fact that it may incorporate a seam so as to be several times thicker at the seam, it is desirable that the portions of the jaws which engage it be resilient so that any irregularities are accommodated and the tube is held in firm engagement with the closure during the welding operation thereby insuring a homogeneous seal for the contents of the package.

Referring to FIG. 3, there is shown an alternative clamping or compression device 56 which comprises an annular support member 57 which may be conveniently formed of metal and which has mounted therein an annular tube 58 formed of a resilient material such as rubber. A fluid line 59 is connected through an opening in the member 57 and connects to the interior of the tube 58. Fluid is controllably supplied to the line 59 from a line 60 connected to a suitable source of pressurized fluid (not shown) through a three-way valve 61 thereby to expand the tube 58 and thus compress the tube 22 which extends therethrough against the skirt of the closure. After the spin-welding operation has been completed and it is desired to remove the package from the clamping device 56, the valve 61 is again operated to connect the interior of the tube 58 to the atmosphere whereby the tube 58 deflates to release the completed package.

There is thus provided in accordance with the present invention a method and system for sealably connecting a plastic closure to a thin-walled plastic tube. The tube 20 may be formed of plastic film or it may be formed of a laminate wherein the inner surface is plastic, and the closure may be secured thereto either before or after the tube is filled. While the tube 20 may be seamless it ordinarily will have a longitudinal seam whereby it is considerably thicker at the seam than elsewhere as shown in FIG. 5. In a reduction to practice of the invention, a tube 20 formed of film and having a wall thickness of 0.007 inch except at the seam where the thickness was 0.021 inch was spin-welded to a plastic closure and provided a hermetic seal between the tube and the closure. The groove 18 in the closure should preferably be about 0.026 inch in thickness where the wall thickness of the tube is 0.021 inch at the seam. Moreover, the groove 18 should preferably have a depth of about 0.033 inch or more for reason of esthetics.

In the embodiment of the invention shown in FIG. 1, the closure element is welded to the inner surface of the flexible tube and the annular recess 18 is provided so that the end of the tube is hidden. In accordance with another embodiment of this invention the closure is welded to the outer surface of the tube whereby the end of the tube is hidden by the closure.

Referring to FIG. 4, there is shown two stations of a package forming line for providing a hermetic seal between a closure element 70 and a flexible tube 72. The tube 72 may be an extruded seamless tube or it may have a longitudinal seam. Where the tube 72 includes a seam, it is preferable that the seam be formed in the manner shown in FIG. 6 so that the outer surface of the tube is substantially smooth except for the very narrow groove 73. In this regard and as best shown in FIG. 5 it will be noted that the seam is formed on the outside of the tube 20 when the closure is welded to the inner surface of the tube. Therefore, during the welding operation there is sufficient plastic flow to seal over the narrow groove 73.

As shown in FIG. 4 the closure 70, which is formed of plastic, has a cylindrical skirt portion 74 which terminates at an internal annular shoulder 76 against which the distal end 78 of the tube 72 abuts in the final package. The tube 72 has an appropriate length and is fitted over a mandrel 80 with a narrow end portion of the tube 72 extending beyond the end of the mandrel. An expandable jaw or compression device 82 is mounted on the end of the mandrel 80 by means of a rod 84 which extends through the mandrel.

The closure 70 is supported in a chuck 86 and the chuck 86 and mandrel 80 are moved together to insert the lower end of the tube 72 into the closure 70, so that the end 78 abuts the shoulder 76. The device 82 is then expanded to press the tube 72 against the inner surface of the skirt portion 74 of the closure 70. The compression device 82 has a substantially annular outer surface 88 which is resilient and may be formed of rubber or some other suitable elastomer. As illustrated in FIG. 4, the device 82 includes a cam member 90 secured to the end of the rod 84 whereby rotation of the rod 84 operates an expansion ring 92 to press the lower end portion of the tube 72 against the skirt 74 and to hold the tube stationary during rotation of the closure element 70 during the spin-welding operation as shown at the second station.

After the tube 72 and the closure 70 have been welded together, the clamping device 82 is released by rotating the rod 84, and the mandrel 80 and the clamping device 82 are removed from the tube 72 while the closure 70 is held in the chuck 86. The tube may then be filled and the top sealed before the chuck 86 is operated to release the closure 70 and thus the filled and sealed package.

While the present invention has been described in connection with certain embodiments thereof it will be understood that many changes and modifications may be made without departing from the true spirit and the scope of the present invention. It is intended, therefore, to cover all such changes and modifications in the appended claims.

We claim:

1. A method of welding a relatively rigid plastic member to a flexible, tubular plastic member, where an annular portion of said rigid plastic member has a diameter slightly less than the diameter of said tubular plastic member, said method comprising the steps of
    inserting said annular portion of said rigid plastic member into said tubular member,
    then moving a compression means into engagement with an annular external surface portion of said tubular member opposite said annular portion of said rigid plastic member and pressing said tubular member in a radial direction into tight engagement with said annular portion of said rigid plastic member,
    then rotating said rigid plastic member relative to said compression means at a speed sufficient to cause the temperature at the interface between said members to exceed the melting point of at least one of said members,
    terminating said relative rotation, and releasing said compression means,
    whereby said members are welded together throughout a continuous area.

2. A method according to claim 1 wherein the portion of said compression means which engages said tubular member is provided with an elastomeric face.

3. A method according to claim 1 wherein
    a mandrel is inserted into a portion of said tubular member to hold it in an open position prior to the insertion of said rigid plastic member therein.

4. A method according to claim 1 wherein said annular portion of said rigid plastic member is a skirt, and an annular recess is provided in said rigid plastic member in line with the outer surface of said skirt, the method including the additional step of
    inserting a distal end of said tubular member at least partially into said recess during insertion of said rigid plastic member into said tubular member.

5. A method according to claim 4 wherein the distal edge of said tubular member is spaced a sufficient distance from the bottom of said recess to provide a reservoir into which plastic from said tubular member flows during the welding thereof to said rigid plastic member.

6. A method according to claim 1 wherein said rigid plastic member is a closure and said method includes the additional step of sealably closing the lower end of said tubular member, and then
    substantially filling said tubular member with a non-gaseous material prior to inserting said rigid plastic member therein.

7. A method according to claim 1 wherein said annular portion of said rigid plastic member is a skirt and an annular shoulder is provided on said rigid plastic member adjacent said skirt, said method including the step of
    positioning said shoulder in abutment with the upper edge of said tubular member at the time said rigid plastic member is inserted therein.

8. A method according to claim 7 including the additional step of initially
    forming said tubular member of a laminate of plastic and metal with the upper portion thereof having a plastic inner surface.

9. A method of packaging a fluid in a thin film tube comprising the steps of supporting a plastic closure element in a rotatable member, positioning a plastic surface of a flexible tube formed of thin film plastic against an upstanding skirt portion of said closure element,
    resiliently compressing an annular area of said tube against said skirt,
    rotating said closure element relative to said tube to melt the interface of said closure element and said tube,
    then filling said tube with said fluid, and
    sealably closing the upper end of said tube.

10. A method according to claim 9 wherein the step of closing the upper end of said tube comprises,
    inserting a generally cylindrical portion of a second plastic closure element into the upper end of said tube,
    compressing an annular area at the upper portion of said tube against said second plastic closure, and
    rotating said second plastic closure to melt the interface of said tube and said second plastic closure.

11. A method of welding a relatively rigid plastic closure member to a flexible tube having a plastic surface, said method comprising the steps of
    placing a generally cylindrical portion of said closure member against the plastic surface of said tube, moving a compression means against the opposite surface of said tube to press an annular area of said plastic surface against said closure member, then rotating said closure member relative to said compression means to melt the plastic at the interface of said tube and said closure member, terminating said relative rotation, permitting the plastic at said interface to set, releasing said compression means, and removing said tube and said closure member as an assembled unit.

12. A method as set forth in claim 11 wherein the outer surface of said tube is plastic and said tube is inserted into said closure member to position said plastic surface against the cylindrical portion thereof.

* * * * *